Dec. 10, 1946.  J. P. DUNNE.  2,412,448
ROTARY VALVE AND LUBRICATING MECHANISM THEREFOR
Filed March 25, 1944   2 Sheets-Sheet 1

Inventor
JOHN PAUL DUNNE,
By *Clarence A. O'Brien and Harvey B. Jacobson*
Attorneys Inventor
JOHN PAUL DUNNE Patented Dec. 10, 1946

2,412,448

UNITED STATES PATENT OFFICE 2,412,448

ROTARY VALVE AND LUBRICATING MECHANISM THEREFOR

John Paul Dunne, Seneca Falls, N. Y.

Application March 25, 1944, Serial No. 528,135

3 Claims. (Cl. 123—80)

My invention relates to improvements in rotary valves and valve lubricating mechanism for internal combustion engines.

Among the important objects of my invention are to obviate in internal combustion engines hot spots in the combustion chamber exposed to gases during compression, and thereby attain higher compression than is possible with poppet valves, to provide for larger diameter ports than is feasible with poppet valves, and arranging for the passage of gases into the combustion chamber at intake and exhaust in substantially straighter lines than has heretofore been possible, thereby promoting operating efficiency by reducing friction in passage of gases into and out of the combustion chamber, to maintain uniform valve priming and constant contact of valves with cool walls with no portion of the valve continuously exposed to hot gases of the combustion chamber, thereby further increasing operating efficiency of the valves, to attain appreciable economy in fuel consumption by providing for high compression ratio, to provide for increased power as compared with poppet valve engines, to obviate overheating with the engine running with open throttle, and to reduce formation of carbon by maintaining the valves continually cool.

Other and subordinate objects are also comprehended by my invention, all of which, together with the precise nature of my improvements, will be readily understood when the succeeding description and claims are read with reference to the drawings accompanying and forming part of this specification.

Figure 1:
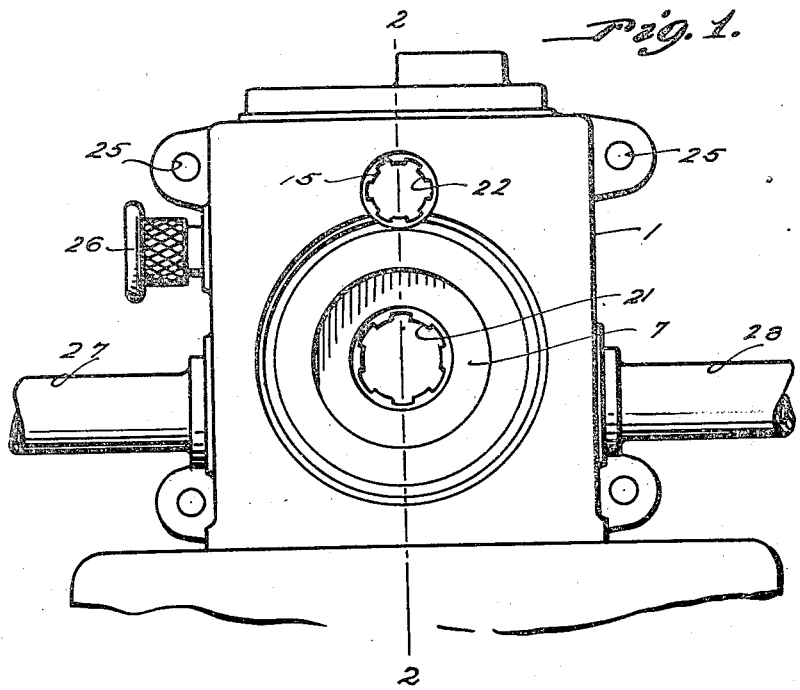
Figure 1 is a view in elevation of my invention in its preferred embodiment.
Figure 4:
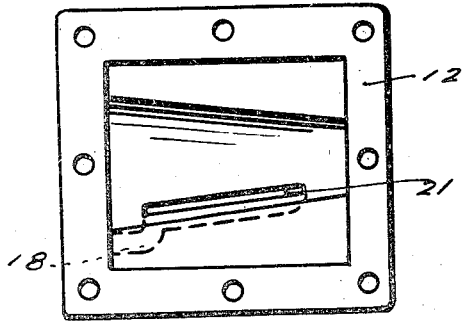
Figure 4 is a view in top plan with the oil distributor bearing removed.
Figure 5:
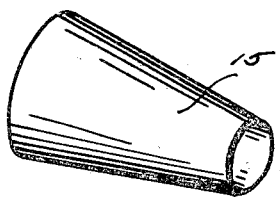
Figure 5 is a view in perspective of the oil distributor roller.
Figure 6:
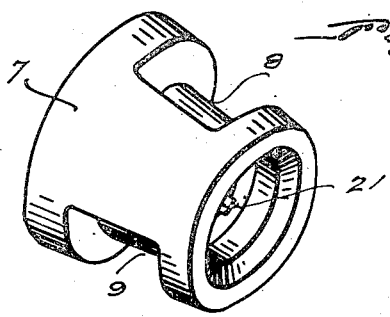
Figure 6 is a similar view of the rotary valve member.

Referring to the drawings by numerals, according to my invention, a cylinder head 1 in the form of a cast rectangular block is provided for attachment, in any suitable manner, to the cylinder, not shown, of an internal combustion engine, and which is suitably jacketed for cooling by the usual water cooling system of the engine.

The head 1 is formed in the lower and central part thereof, and in the median vertical plane of the same, with a tapered valve seat 2 of frustoconical shape having an horizontal axis, a fuel distributing port 3 at the bottom of said seat 2 and centered relative to the same, an arched combustion chamber 4 in the bottom of the head 1 into which said port 3 opens, and a pair of horizontally aligned fuel inlet and exhaust ports 5, 6 upon opposite sides of the seat 2 adjacent the bottom thereof and which are of cylindrical form and uniform diameter.

A tapered rotary valve 7 is fitted in the valve seat 2 for rotation there in and is provided at diametrically opposite sides thereof with a pair of longitudinally extending, elongated, peripheral pockets 8, 9 closed at the ends thereof.

Above the valve 7, the head 1 is formed, in the top thereof, with a well 10 in which is fitted downwardly a bearing block 11 having upper edge flanges 12 resting on top of said head. The well 10 has a central bottom slot 10' therein parallel with the top of the seat 2 and opening into said seat, and the block 11 is grooved in its bottom, as at 13, to form with the bottom of the well a tapered seat 14 vertically aligned with and paralleling the seat 2 and which is preferably relatively smaller than said seat and tapered oppositely relative to the seat 2.

An oil distributing roller 15, tapered in correspondence with the taper of the seat 14, is rotatably fitted therein to peripherally engage the valve 7 and rotate on said valve. The groove 13 in the block 11 fits over the upper half of the distributor roller 15. As will presently more clearly appear, the bearing block 11 acts as a wiper to distribute a film of oil over the distributor roller 15. Suitable bolts, not shown, may be provided for securing the bearing block 11 to the cylinder head 1. The bearing block 11 is provided, alongside the oil distributing roller 15 and adjacent the top of the groove 13, with an oil feeding groove 16 closed at its ends and opening onto the periphery of the roller 15 along which it extends at the same inclination as that of the periphery of said roller and with its lower end communicating with an oil inlet duct 17 extending downwardly through the bearing block 11, and its higher end communicating with an oil discharge duct 18 in said block. The ducts 17 and 18 are suitably arranged for connection in a low pressure oil feed circulating system of any suitable type and which it has not been deemed necessary to illustrate.

A lateral port 19 communicating with the outside atmosphere extends into the head 1 transversely of the seat 2 and opens, as at 20, into the top of said seat at one side thereof for communication with the pockets 8, 9 for a purpose presently apparent.

Figure 2:
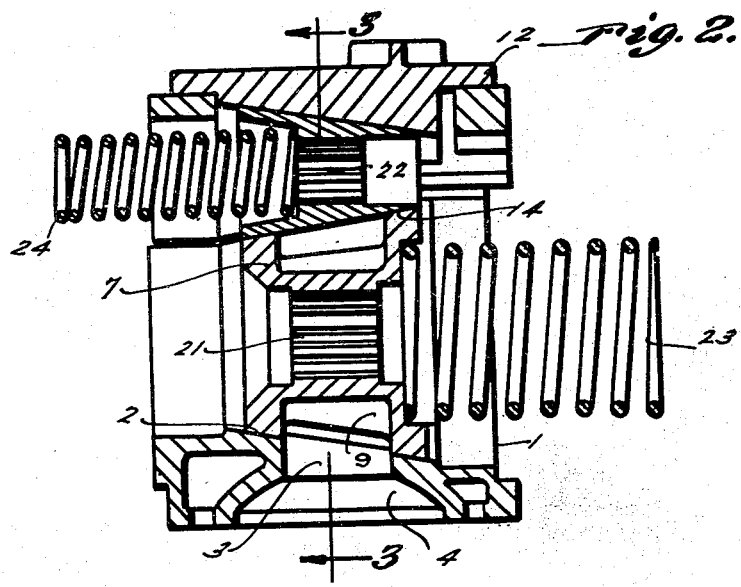
Figure 2 is a view in vertical section taken on the line 2—2 of Figure 1.

The valve 7 and roller 15 are provided with fluted axial bores 21, 22 for connection to drive shafts, not shown, and coil springs 23, 24 are fitted at inner ends thereof into the larger ends of the valve 7 and the roller 15 and which urge the same into their seats. The springs 23, 24 are suitably extended through the sides of the head 1, as shown in Figure 2. Lateral lugs 25 are provided on the head 1 for attaching purposes and an air filter 26 of any suitable type may be provided at the inlet end of the port 19. It is contemplated that the springs 23, 24 be arranged at their outer ends to bear against valves and rollers of another head, not shown.

The intake port 5 is designed to be connected, as by the manifold pipe 27, to the fuel supply source, not shown, and the exhaust port 6 to an exhaust manifold, a part of which is shown at 28.

Figure 3:
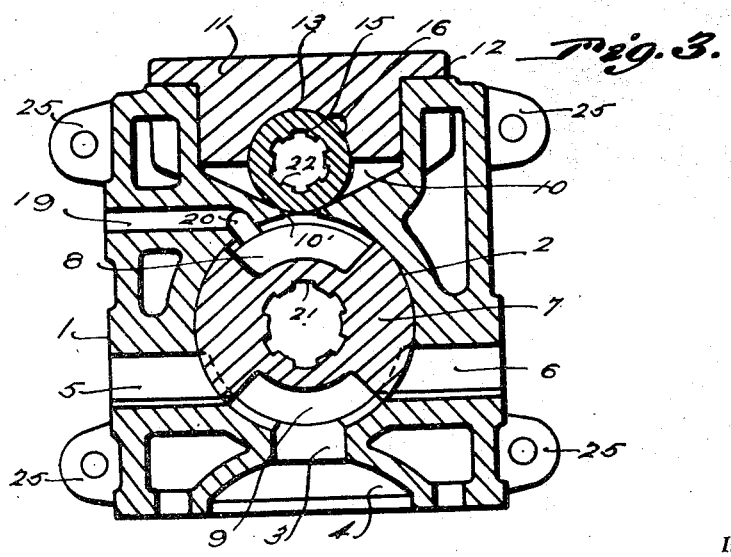
Figure 3 is a similar view taken on the line 3—3 of Figure 2.

It is contemplated that the valve 7 be driven at preferably one-fourth the speed of the crankshaft, not shown, of the engine clockwise, as viewed in Figure 3, and that the roller be driven in the opposite direction from the valve 7, or by any suitable means including the beforementioned drive shafts, but it has not been deemed necessary to a proper understanding of the invention to illustrate the drive for the valve and roller.

Referring now to the operation of my invention, as valve 7 rotates in the direction of the arrow in Figure 2, the pocket 9 establishes communication between the inlet port 5 and the port 3 to admit fuel into the combustion chamber 4 while the piston of the related cylinder is in its suction stroke. At the proper time, the valve 7 closes the port 3 and the inlet port 5. The valve 2 continues to rotate with a partial vacuum in the pocket 9, and as said pocket rotates into communication with the port 19, the vacuum is relieved and any fuel remaining in the pocket 9 may be vented out through the port 19 to the inlet manifold 27, where, by suction of other cylinders, it will be saved. In the meantime, the pocket 8 has rotated to communicate the exhaust port 6 with the port 3 to permit exhaust to occur. During this operation, oil will be fed slowly to groove 16 and oil distributor roller 15, which, rotating on the valve 7, will have distributed a film of oil on said valve. The bearing block 11 will have spread a thin film of oil on the roller 15 and the latter will have caused a thin film of oil to be applied to the valve 7. By having the valve 7 and the oil distributor roller 15 tapered reversely, relatively, spreading of the oil film thereover is facilitated, the oil tending to run downwardly along said valve and roller under the influence of gravity. The cycle of operation described is, of course, repeated.

A particular feature of my invention is that it is designed to furnish ample oil at open throttle feed and to eliminate the partial vacuum in the pockets of the valve to prevent the exhaust from becoming smoky and the sparkplug from being fouled, particularly at low speed.

In rotation of the oil distributor roller 15 and the valve 7, a certain amount of friction results between the ends thereof because of different velocity ratios at their respective ends. Also, friction arises between said roller 15 and the bearing block 11 which increases toward the ends of said roller. The pressure exerted by the spring 24 is very light, being merely sufficient to obtain the proper thickness of oil film between said roller and valve. Because of the light pressure of said spring, and the presence of the oil film, the amount of friction obtaining is of distinct advantage in thinning the oil film.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A block-like cylinder head provided in the bottom face thereof with a combustion chamber, a frusto-conical fuel control valve rotatably mounted in said head above said chamber with the axis thereof at a right angle to the axis of the chamber, a fuel distributing duct in said head between said chamber and valve and controlled by said valve, and means in said head above said valve to apply a film of oil to the periphery of the valve along the top thereof comprising a frusto-conical oil distributing roller above and parallel with said valve and mounted in said head to rotate on the valve, and means to flow oil against one side of said roller along said side, said valve and roller being oppositely coned relatively.

2. A block-like cylinder head provided in the bottom face thereof with a combustion chamber, a frusto-conical fuel control valve rotatably mounted in said head above said chamber with the axis thereof at a right angle to the axis of the chamber, a fuel distributing duct in said head between said chamber and valve and controlled by said valve, and means in said head above said valve to apply a film of oil to the periphery of the valve along the top thereof comprising a frusto-conical oil distributing roller above and parallel with said valve and mounted in said head to rotate on the valve, said valve and roller being oppositely coned relatively, and means to flow oil against one side of said roller along said side comprising a grooved bearing block mounted on said head to fit over the upper half of said roller and an oil distributing groove in said block extending along said side of the roller, said block wiping against said roller to distribute oil over the same in a film, said block having a well therein into which the lower half of said roller is disposed, said well having a bottom slot therein through which said roller extends.

3. A block-like cylinder head provided in the bottom face thereof with a combustion chamber, a frusto-conical fuel control valve rotatably mounted in said head above said chamber with the axis thereof at a right angle to the axis of the chamber, a fuel distributing duct in said head between said chamber and valve and controlled by said valve, and means in said head above said valve to apply a film of oil to the periphery of the valve along the top thereof, said head being provided with intake and exhaust ports upon opposite sides of said valve respectively, the valve having a pair of diametrically opposite pockets therein for communicating the intake and exhaust ports with the fuel distributing duct alternately, and means to vent said pockets to the outside atmosphere as said pockets are rotated past said intake port.

JOHN PAUL DUNNE.